United States Patent
Novak et al.

(10) Patent No.: US 7,210,655 B2
(45) Date of Patent: May 1, 2007

(54) RECONFIGURABLE INTERIOR SIDEWALL

(75) Inventors: Keith H. Novak, Shoreline, WA (US); Peter S. Guard, Sammamish, WA (US); David A. Young, Seattle, WA (US)

(73) Assignee: The Boeing Company, Chicago, IL (US)

( * ) Notice: Subject to any disclaimer, the term of this patent is extended or adjusted under 35 U.S.C. 154(b) by 138 days.

(21) Appl. No.: 11/004,292

(22) Filed: Dec. 3, 2004

(65) Prior Publication Data

US 2006/0192051 A1    Aug. 31, 2006

(51) Int. Cl.
*B64C 1/00* (2006.01)

(52) U.S. Cl. ...................................................... 244/119

(58) Field of Classification Search ................ 244/119, 244/121, 118.1–118.6, 129.1–129.5, 117 R, 244/120, 211, 131; 52/782.1–802.11
See application file for complete search history.

(56) References Cited

U.S. PATENT DOCUMENTS

| | | | | |
|---|---|---|---|---|
| 2,396,039 | A * | 3/1946 | Graves et al. ............ | 244/118.1 |
| 2,403,195 | A * | 7/1946 | Ross, Jr. ..................... | 244/121 |
| 2,439,553 | A * | 4/1948 | Winn ......................... | 359/228 |
| 2,494,690 | A * | 1/1950 | Cerny ..................... | 244/118.1 |
| 2,784,926 | A * | 3/1957 | Bonza et al. ............ | 244/129.3 |
| 2,925,050 | A * | 2/1960 | Candlin, Jr. et al. ........ | 105/397 |
| 2,944,601 | A * | 7/1960 | Compson ............... | 160/370.21 |
| 3,050,790 | A * | 8/1962 | Wakefield ................... | 49/215 |
| 3,338,293 | A * | 8/1967 | Hohmann .............. | 160/370.21 |
| 3,429,530 | A * | 2/1969 | Hertel ...................... | 244/129.3 |
| 3,906,669 | A * | 9/1975 | Vorguitch .................... | 49/372 |
| 3,919,022 | A * | 11/1975 | Stefanik ..................... | 156/104 |
| 3,953,630 | A * | 4/1976 | Roberts et al. ............... | 428/38 |
| 3,993,866 | A * | 11/1976 | Pearl et al. .................. | 348/151 |
| 4,261,649 | A * | 4/1981 | Richard ..................... | 359/614 |
| 4,264,044 | A * | 4/1981 | White .................... | 244/135 A |
| 4,364,533 | A * | 12/1982 | Pompei et al. .......... | 244/129.3 |
| 4,399,347 | A * | 8/1983 | Schmitt ..................... | 219/203 |
| 4,541,595 | A * | 9/1985 | Fiala et al. .............. | 244/129.3 |

(Continued)

FOREIGN PATENT DOCUMENTS

EP       1 348 621 A2    1/2003

(Continued)

OTHER PUBLICATIONS http://www.moea.state.mn.us/publications/dfe-fasteners.pdf (available on the web Dec. 4, 2003).*

*Primary Examiner*—Teri Pham Luu
*Assistant Examiner*—Stephen A Holzen
(74) *Attorney, Agent, or Firm*—Ingrassia Fisher & Lorenz, P.C.

(57) ABSTRACT

A reconfigurable interior sidewall system includes one or more simply curved sidewall panels, each curved around the fuselage but longitudinally linear and providing a consistent mating surface for monuments. Panel openings are provided in each panel so that inner window assemblies may be installed for opposing structural windows, each inner window assembly having outward sculpturing for additional cabin room. A cover plate is also provided for flush insertion into the opening to fill the opening when it is not needed and to provide a constant profile for cabin monuments whenever the layout of the cabin changes. This results in the production of fewer parts as well as facilitating faster and less expensive interior reconfigurations.

8 Claims, 8 Drawing Sheets

U.S. PATENT DOCUMENTS

| | | | | |
|---|---|---|---|---|
| 4,607,875 A * | 8/1986 | McGirr | ................ | 296/97.7 |
| 4,637,447 A * | 1/1987 | Frank et al. | ................ | 160/265 |
| 4,678,226 A * | 7/1987 | Ishizuka et al. | ........ | 296/203.03 |
| 4,739,955 A * | 4/1988 | Aquino et al. | ............ | 244/129.4 |
| 4,749,222 A * | 6/1988 | Idland | ................ | 296/152 |
| 4,759,581 A * | 7/1988 | McNamee | ................ | 296/97.7 |
| 4,778,446 A * | 10/1988 | Jensen | ................ | 604/27 |
| 4,877,658 A * | 10/1989 | Calhoon | ................ | 428/34 |
| 4,910,088 A * | 3/1990 | Baudin et al. | ................ | 428/432 |
| 4,915,152 A * | 4/1990 | Magee | ................ | 160/31 |
| 5,044,578 A * | 9/1991 | White et al. | ................ | 244/119 |
| D331,215 S * | 11/1992 | Moreno et al. | ................ | D12/183 |
| 5,201,831 A * | 4/1993 | Higgins et al. | ................ | 244/119 |
| 5,271,581 A * | 12/1993 | Irish | ................ | 244/129.3 |
| 5,354,377 A * | 10/1994 | Jeffrey, Jr. | ................ | 118/505 |
| 5,397,080 A * | 3/1995 | Berg | ................ | 244/129.2 |
| 5,462,243 A * | 10/1995 | Hart et al. | ................ | 244/121 |
| 5,467,943 A * | 11/1995 | Umeda | ................ | 244/129.3 |
| 5,662,152 A * | 9/1997 | Sanz et al. | ................ | 160/84.02 |
| 5,670,742 A * | 9/1997 | Jones | ................ | 174/384 |
| 5,788,347 A | 8/1998 | Rabinovitz | | |
| 5,799,449 A | 9/1998 | Lyons et al. | | |
| 5,816,307 A * | 10/1998 | Sanz | ................ | 160/84.04 |
| 6,082,674 A * | 7/2000 | White et al. | ................ | 244/129.3 |
| 6,129,312 A * | 10/2000 | Weber | ................ | 244/118.5 |
| 6,161,605 A * | 12/2000 | Pena | ................ | 160/90 |
| 6,222,188 B1 * | 4/2001 | Davis | ................ | 250/330 |
| 6,227,491 B1 * | 5/2001 | Stephan et al. | ................ | 244/129.3 |
| 6,308,918 B1 * | 10/2001 | Ferrier | ................ | 244/129.3 |
| 6,341,748 B1 * | 1/2002 | Brooks et al. | ................ | 244/129.5 |
| 6,427,383 B1 * | 8/2002 | Brooks et al. | ................ | 49/141 |
| 6,429,961 B1 * | 8/2002 | Harary et al. | ................ | 359/296 |
| 6,547,184 B2 * | 4/2003 | Nieberle | ................ | 244/119 |
| 6,601,799 B2 * | 8/2003 | Lau et al. | ................ | 244/129.3 |
| 6,712,316 B2 * | 3/2004 | Jones | ................ | 244/132 |
| 6,736,352 B2 * | 5/2004 | Bladt et al. | ................ | 244/129.3 |
| 6,745,810 B1 * | 6/2004 | Moreno et al. | ................ | 160/97 |
| 6,758,255 B2 * | 7/2004 | Sanz et al. | ................ | 160/84.06 |
| 6,786,453 B2 * | 9/2004 | Jones | ................ | 244/129.3 |
| 6,789,765 B2 * | 9/2004 | Hopkins et al. | ................ | 244/129.3 |
| 6,793,182 B2 * | 9/2004 | Hopkins et al. | ................ | 244/129.3 |
| 6,922,944 B1 * | 8/2005 | Krueger | ................ | 49/171 |
| 7,024,830 B2 * | 4/2006 | Schiedegger et al. | .... | 52/204.61 |
| 7,028,950 B2 * | 4/2006 | Salmon et al. | ................ | 244/129.3 |
| 7,029,535 B1 * | 4/2006 | Bechtold, Jr. | ................ | 118/504 |
| 7,080,807 B2 * | 7/2006 | Olson et al. | ................ | 244/129.3 |
| 7,118,069 B2 * | 10/2006 | Novak et al. | ................ | 244/119 |
| 7,134,244 B2 * | 11/2006 | Diamond | ................ | 52/202 |
| 2003/0080252 A1 * | 5/2003 | Jones | ................ | 244/129.3 |
| 2003/0178531 A1 * | 9/2003 | Hopkins et al. | ................ | 244/129.3 |
| 2003/0192991 A1 * | 10/2003 | Rukavina et al. | ................ | 244/129.3 |
| 2004/0021039 A1 * | 2/2004 | Jones | ................ | 244/131 |
| 2004/0065777 A1 * | 4/2004 | Hopkins et al. | ................ | 244/129.3 |
| 2004/0155148 A1 * | 8/2004 | Folkesson et al. | ................ | 244/119 |
| 2004/0262453 A1 * | 12/2004 | Sanz et al. | ................ | 244/129.3 |
| 2005/0005544 A1 * | 1/2005 | Borowiecki et al. | ........ | 52/204.5 |
| 2005/0167546 A1 * | 8/2005 | Jones et al. | ................ | 244/118.5 |
| 2005/0247822 A1 * | 11/2005 | Salmon et al. | ................ | 244/129.3 |
| 2006/0071127 A1 * | 4/2006 | Wood et al. | ................ | 244/129.3 |
| 2006/0118676 A1 * | 6/2006 | Novak et al. | ................ | 244/129.1 |
| 2006/0180277 A1 * | 8/2006 | Lin | ................ | 160/84.04 |

FOREIGN PATENT DOCUMENTS

EP        1 306 302 A2     2/2003

* cited by examiner

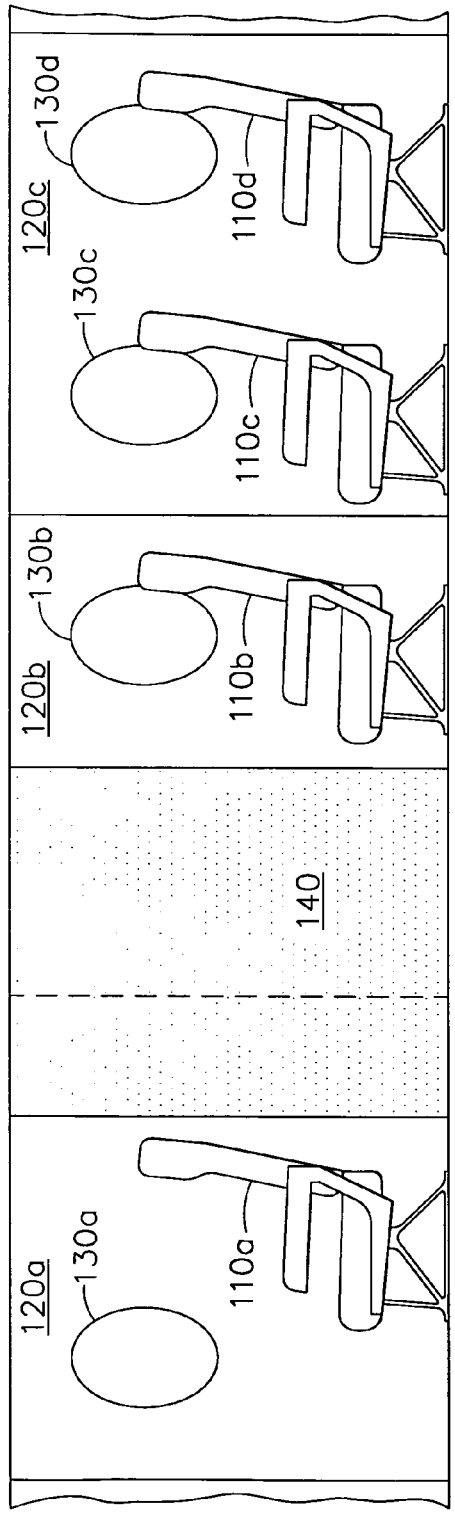
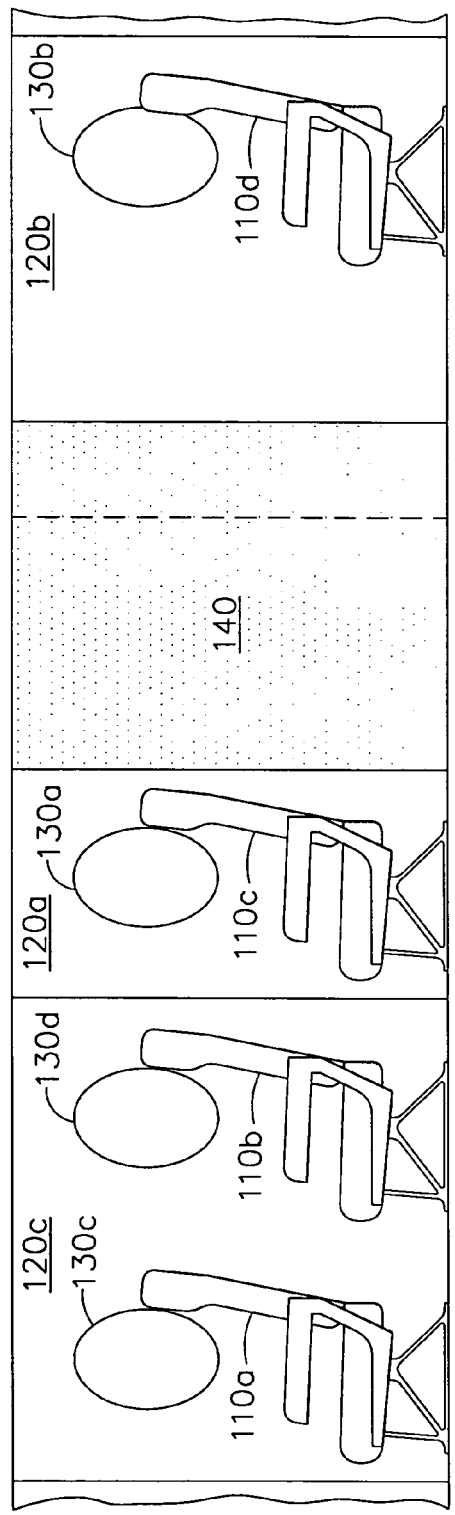
FIG. 1A (PRIOR ART)
FIG. 1B (PRIOR ART)

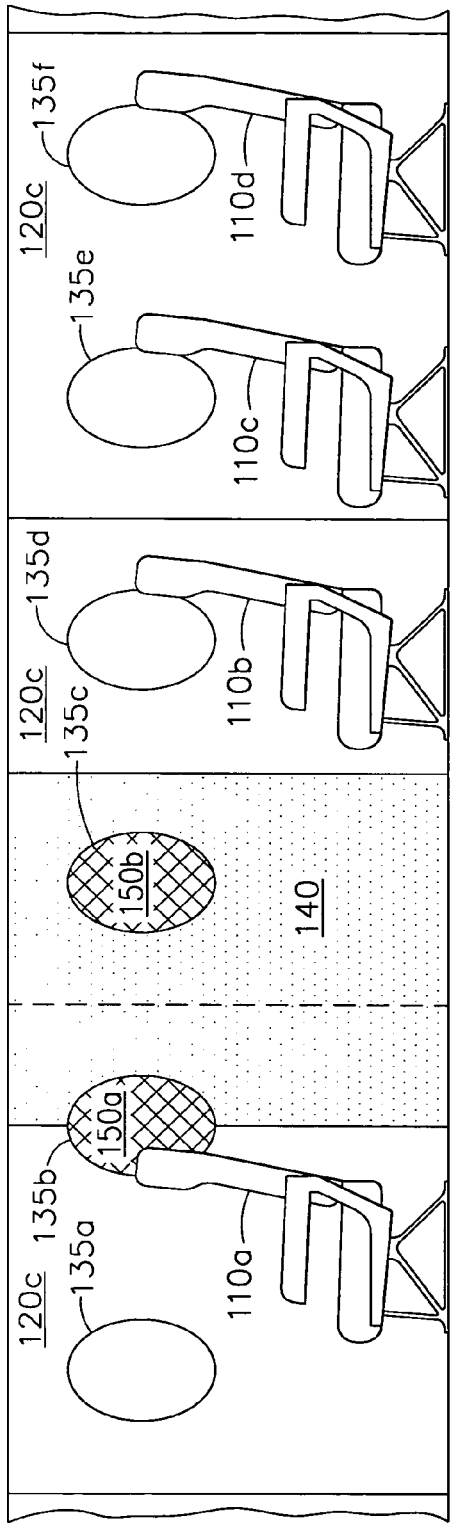
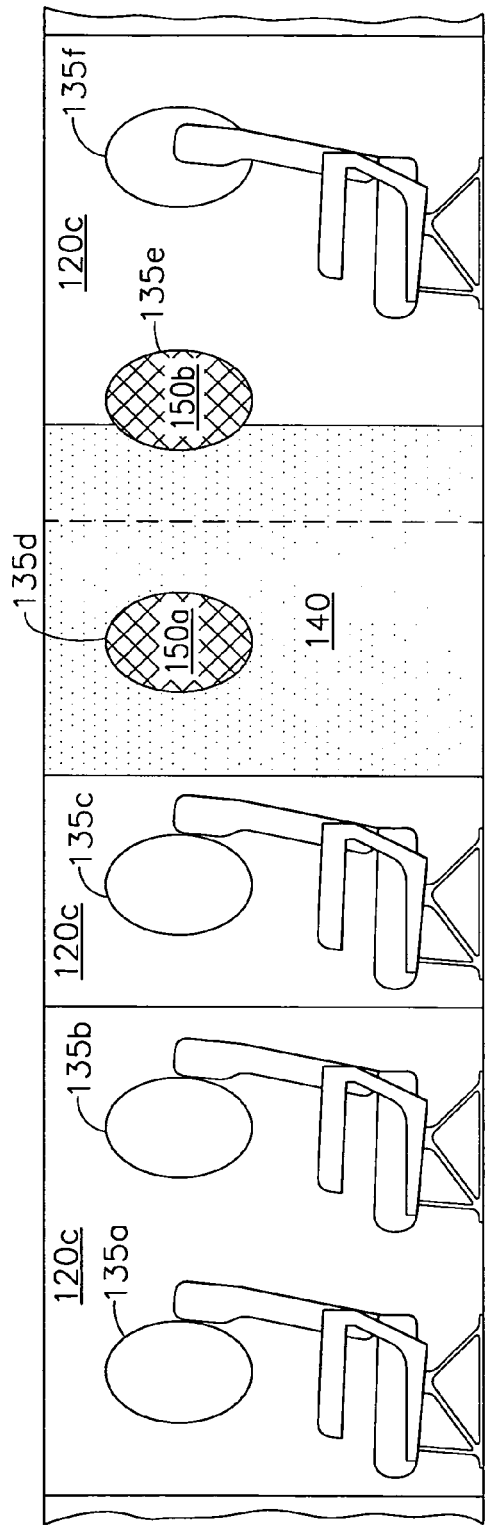
FIG. 3A
FIG. 3B

RECONFIGURABLE INTERIOR SIDEWALL

BACKGROUND OF THE INVENTION

The present invention generally relates to sidewall panel systems for aircraft cabins and, more particularly, to a sidewall panel having reconfigurable inserts allowing the panel to be placed anywhere along the cabin wall.

Present-day commercial aircraft cabins typically have various layouts depending upon the use to which the aircraft is being put. These layouts are made up of such items as seating for personnel, overhead bins for storage of personal items, sidewall panels covering the interior walls of the cabin, and monuments (i.e., closets, restrooms, interior dividers, and other space-defining items). The sidewall panels may have panel openings that oppose structural windows in the outer wall of the fuselage, so that passengers can see out of the aircraft. When there is a structural window in the outboard wall of the aircraft, a sidewall panel opening is aligned with the structural window and an inner window assembly is inserted through the sidewall panel to mate with the structural window. The sidewall panels must be configured to match different layouts with structural windows having different spacing arrangements. Aircraft designers desire consequently to minimize the number of different types of sidewall panels with respect to the panel openings required to accommodate these various layouts and structural window arrangements.

Therefore, efforts have been made to standardize the configuration of the sidewall panels so as to reduce panel inventory and tooling costs. Typically, a sidewall panel may have a given width when accommodating a single opening and a double width when accommodating two openings. For single width panels, there may be two more types, one with an opening and one without an opening. For double width panels, there may be four types, i.e. an opening on the left, an opening on the right, openings on both sides, and no openings. This is necessary since monument placement within the layout generally requires a standardized profile along the sidewall panel so that the monument may conform to the panel as needed. As can be readily seen, as the number of sidewall panel types that have sufficient width to accommodate three or more openings increases, the number of panel/window opening permutations increases geometrically. This in turn increases the different distinguishable sidewall panel types that must be fabricated. Each separate panel type requires different tooling, which in turn increases expense. Furthermore, in certain places in the airplane, non-standard frame spacings may require different width sidewalls, which further multiplies the number of different sidewall configurations and external window arrangements.

When an aircraft operator reconfigures the cabin interior, e.g. adding or reducing seats in different seating classes, the monuments for that layout may also have to be moved, which may result in covering or uncovering window openings. This may require different sidewall types to be installed. Therefore, the aircraft owner must also stock multiple spare sidewall configurations to cover each of the sidewall variants.

Sculpturing around the window opening complicates the reconfiguration process. On some aircraft models, the sidewall profile is different along its length due to sculpturing around the windows, and therefore simply blanking out a window hole would still result in a unique interface between the monument and the sidewall to fill the gap between the outboard monument profile and the inboard sidewall profile.

More specifically, prior art sidewall panels must have multiple configurations and types, so that different cabin layouts and window arrangements may be accommodated. Prior art sidewall panels also provide sculpturing of the sidewall panel adjacent to the panel opening to provide more room for passengers. Such sidewall panels typically span a space between three frames, or ribs, of a fuselage primary structure with an external structural window interposed between each frame, and thus are said to cover two frame bays. Additionally, some single frame bay sidewalls may also be used to interface with monuments and doorways or when there is an odd number of frame bays between the ends of the sidewall. Multiple sidewall configurations are thus required in the prior art to support monument locations. Typical configurations required are as follows:

Two frame bay panel, left and right sides with window openings
Two frame bay panel, left with window opening and right without window opening
Two frame bay panel, left without window opening and right with window opening
Two frame bay panel, no window openings
One frame bay panel with window
One frame bay panel without window Thus, six separate and distinct sidewall types must be constructed and stocked in order to support different cabin layouts, according to the prior art.

FIGS. 1A and 1B illustrate a typical situation that is frequently encountered when reconfiguring aircraft cabins. Referring to FIG. 1A, three sidewall panels 120a, 120b, 120c are shown, each sidewall panel being of a different type. A closet monument 140 is shown between the first seat row 110a and the second seat row 110b. Since the closet monument 140 overlaps sidewall panels 120a and 120b, then sidewall panel 120a is of a type having a left side with a window opening and a right side without a window opening, and sidewall panel 120b is of a type having a left side without a window opening and a right side with a window opening; sidewall panel 120c is of a type having openings on both sides. Because of window sculpturing, the prior art solution for this particular configuration change has been to provide these three panel types. If it is desired to move the closet monument 140 from a location indicated in FIG. 1A to a location indicated in FIG. 1B, then seat rows 110b and 110c must be moved forward and the closet monument 140 must be moved aft; in order to cover window openings 130b and 130c, all three sidewall panels 120a, 120b, and 120c, must be removed and relocated to a different position along the sidewall; this would require the additional removal of seat rows 110a and 110d in order to access all the sidewall panels 120a–120c.

A typical sidewall panel 200 is shown according to the prior art. According to FIG. 2A, a vertical cross-sectional view of the sidewall panel 200 may be seen. The sidewall panel 200 may have a panel opening 210 into which is inserted a window assembly 240. The sculpturing area 230 immediately around the panel opening 210 may be curved in an outboard direction, indicated by the arrow labeled 288. This outboard curvature may provide additional room to a passenger seated adjacent to the sidewall panel 200, as indicated by the direction of the arrow labeled 299. A flange 250 along around the perimeter of the window assembly 240 may abut the inboard surface 202 of the sidewall panel 200 to hold the window reveal 240 in place within the panel opening 210. As can be readily seen, the replacement of the window assembly 240 by a cover plate to fill the panel opening will not affect the sculpturing around the panel opening. Furthermore, the gradual slope of the sculpturing area 230 as it conforms to the inboard surface 202 may be so gradual so that it is difficult to provide an adequate locking mechanism for a cover or to provide a cover having sufficient thickness around its perimeter to smoothly blend to the inboard surface 202.

The prior art contains a number of examples of how the sidewall panel configuration has been addressed. U.S. Pat. No. 6,082,674 discloses a sidewall panel in which the sculpturing around the inner window is contained in the sidewall so that the inner window, comprising a dust cover and window shade, may be affixed to the outboard side of the sidewall panel. There is no suggestion of using a window reveal to interface the inner window assembly to the sidewall panel, and presumably the opening perimeter of the sidewall panel functions as a window reveal. European Pat. App. No. EP 1306302 A2 discloses a sidewall panel having a snap-in window assembly, in which the sculpturing around the panel opening is shown to be a portion of the sidewall panel. An inner window assembly includes a window reveal that attaches to the opening using snap-in fasteners.

As can be seen, there is a need for reducing the number of sidewall panel configurations by providing modular and interchangeable components to the sidewall system so that the numbers of different types of sidewall panels may be reduced and standardized.

SUMMARY OF THE INVENTION

The present invention provides simply curved sidewall panels (curved vertically around the fuselage but horizontally linear along the length of the airplane) to provide a consistent profile for monument placement. Embodiments of the present invention add features to the outboard side of the sidewall so that a flush mounted cover plate can fill a panel opening when a window is not needed. An inner window assembly may be provided that includes any required sculpturing in the window reveal, thus moving sculpturing from the sidewall panel to the window reveal and allowing more uniformity in the different types of sidewall panel profiles. Thus, a single sidewall panel may be used for multiple window configurations. The configuration of the sidewall panel may be rapidly changed to add or remove windows when interior layout changes occur. This results in the production of fewer parts as well as facilitating faster and less expensive interior reconfigurations. In a case where unique frame spacings exist, only one new tool may be required for the different frame spacing rather than four tools to cover each possible window arrangement.

In one aspect of the present invention, an interior sidewall panel for a cabin area of an aircraft is provided, where the panel comprises a surface with a curved aspect along a vertical axis to conform to an interior side of an aircraft frame and with a linear aspect along a longitudinal axis; and a panel opening in the surface, the panel opening having a recessed lip around its perimeter.

In another aspect of the present invention, a sidewall panel cover plate is provided for filling a panel opening of an aircraft sidewall having a constant curvature, where the cover plate comprises a surface having a profile the same as the aircraft sidewall and a fastener.

In still another aspect of the present invention, a window assembly is provided for an aircraft sidewall panel having a constant curvature, the sidewall panel having a panel opening and an inboard surface, where the window assembly comprises a window reveal providing sculpturing around the panel opening, the window reveal having a flange extending about its periphery for making abutting contact with the inboard surface when the window assembly is inserted through the panel opening from the inboard side of the sidewall panel, the flange preventing further outboard excursion of the window assembly.

In yet another aspect of the present invention, a configurable sidewall assembly is provided, the sidewall assembly comprising a sidewall panel with an inboard surface and an outboard surface, the sidewall panel with a curvature conforming the outboard surface to an aircraft frame, the sidewall panel having a panel opening; a window reveal sized for insertion into the panel opening; and a cover plate sized for insertion into the panel opening when the reveal is not occupying the opening, wherein the cover plate and the window reveal are selectively inserted into the opening.

In yet another aspect of the present invention, an interior sidewall system is provided for a layout of a cabin area in an aircraft, the system comprising a plurality of sidewall panels, each panel curved vertically to conform to an interior side of an aircraft frame and horizontally linear, each panel with at least one opening with all openings having an identical shape; a plurality of cover plates shaped for insertion in an opening; and a plurality of window assemblies shaped for insertion in a selected opening, each window assembly having a window reveal configured with sculpturing, the window reveal with a flange for abutting contact with the inboard surface of a selected panel and held in releasable attachment thereto by a snap-fit fastener that is released from the inboard side of the selected panel, wherein each opening is selectively provided with a cover plate or a window assembly selected according to the layout.

In a further aspect of the present invention, a method is provided for enclosing an interior wall of an aircraft cabin, where the method comprises the following steps: fabricating a sidewall panel that is longitudinally straight and vertically curved, with the sidewall panel having at least one opening; fabricating an inner window assembly with a window reveal that has sculpturing extending outboard of the sidewall panel, with the window assembly sized for removable insertion into a selected opening; shaping a cover plate for removable insertion into a selected opening; installing a plurality of sidewall panels along the interior wall according to an arrangement of monuments and seats within the aircraft cabin; and, for each opening in the plurality of sidewall panels, selecting either a cover plate or a window reveal for insertion into the opening according to the arrangement.

These and other features, aspects and advantages of the present invention will become better understood with reference to the following drawings, description and claims.

BRIEF DESCRIPTION OF THE DRAWINGS

FIG. 1A is an interior elevation view of a typical aircraft cabin showing a layout having seating and a closet monument, according to the prior art;

FIG. 1B is an interior elevation view of the same aircraft cabin as shown in FIG. 1A, but with the closet monument and one row of seating moved to a different location to illustrate the corresponding change required for the adjacent sidewall panels, according to the prior art;

FIG. 3A is an interior elevation view of a typical aircraft cabin showing a layout having seating and a closet monument, according to an embodiment of the invention;

FIG. 3B is an interior elevation view of the same aircraft cabin as shown in FIG. 3A, but with the closet monument and one row of seating moved to a different location to illustrate the corresponding change required for the adjacent sidewall panels, according to an embodiment of the invention;

DETAILED DESCRIPTION OF THE INVENTION

Figure 2A:
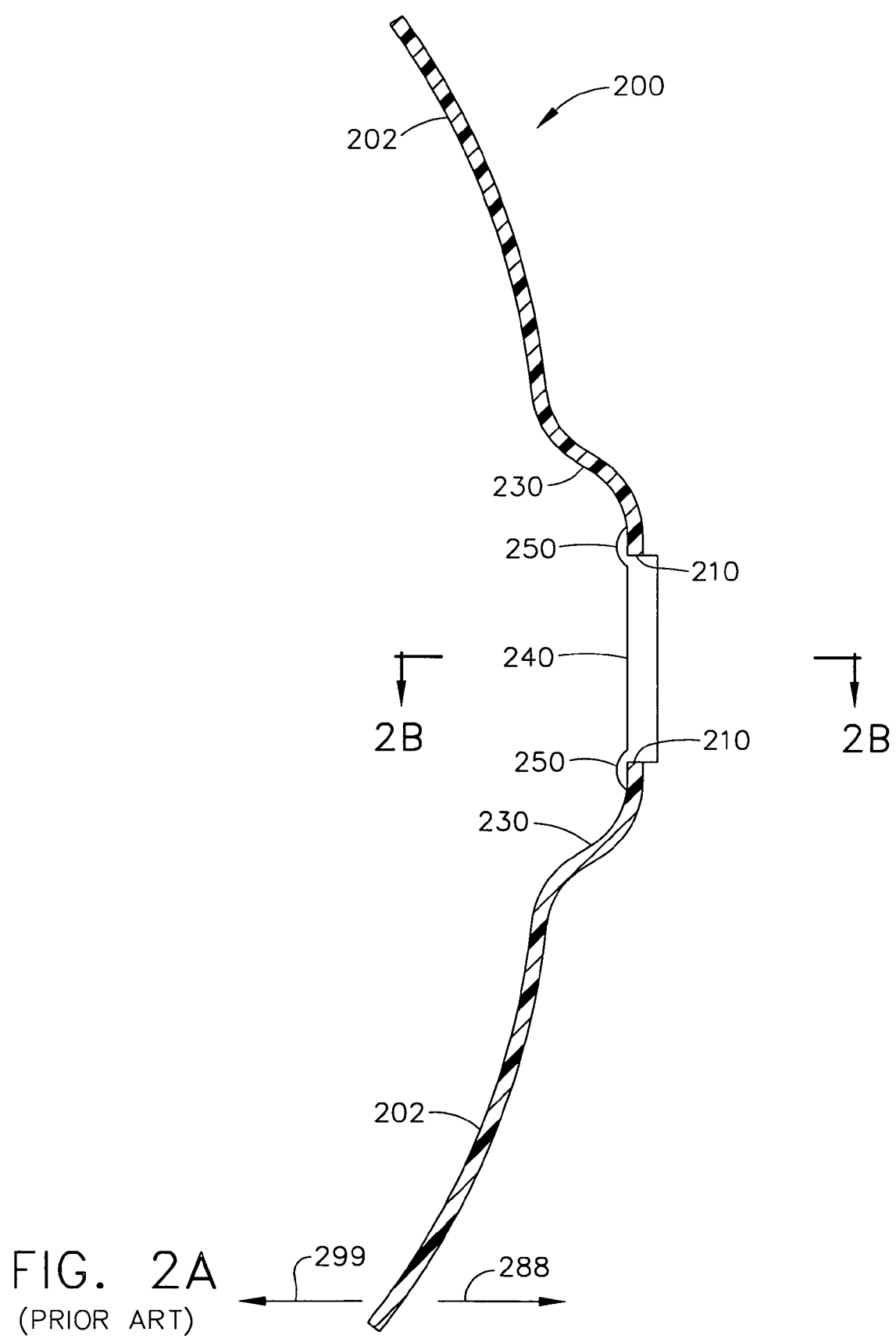
FIG. 2A is a cross sectional view taken along a vertical line of a prior art sidewall panel showing the presence of sculpturing within the sidewall panel around the panel opening, according to the prior art.
Figure 2B:
FIG. 2B is a cross sectional view taken along a horizontal line of a prior art sidewall panel showing the presence of sculpturing within the sidewall panel around the panel opening, according to the prior art.

The following detailed description is of the best currently contemplated modes of carrying out the invention. The description is not to be taken in a limiting sense, but is made merely for the purpose of illustrating the general principles of the invention, since the scope of the invention is best defined by the appended claims.

For ease of understanding the orientation in the drawings, the terms "inside", "inboard", and "interior" shall refer to a direction oriented from the viewpoint of a person standing within the cabin of the aircraft, and the terms "outside", "outboard", and "exterior" shall refer to a direction oriented from the viewpoint of a person outside of the cabin observing the aircraft. Thus, a sidewall panel will have an interior side and an exterior side, where the interior side is that surface of the installed panel as seen by a person within the cabin of the aircraft and the exterior side is that surface of the installed panel that is seen by a person outside of the cabin of the aircraft. Other such descriptions will be obvious from the context. Similarly, the terms "aft" and "forward" are directional terms that indicate a direction away from the aircraft cockpit and towards the aircraft cockpit, respectively.

Broadly, an embodiment of the present invention provides a sidewall panel system for installation along an interior wall of an aircraft cabin. Each sidewall panel may have standard openings to accommodate inner window assemblies, but may be independent of the layout of the cabin interior. A flush-mounted cover plate may be provided by the system to fill panel openings in the sidewall panel when windows are not required. The outboard side of the sidewall panel may allow the cover plate to be snap-fit onto sidewall panel when the interior window structure has been removed. Furthermore, window sculpturing around the window opening may be removed from the profile of the sidewall panel and instead incorporated into the reveal of the window assembly, so that the cover plate may be flush to the panel surface when windows are not required. The present invention may be employed in aircraft cabins of commercial aircraft to enable the interior to be more easily reconfigured by the aircraft manufacturer according to the requirements of the customer to accommodate variable positioning of monuments within the cabin interior.

Window sculpturing has been incorporated as part of the sidewall panel in the prior art. The present invention moves the sculpturing to the window reveal of the inner window assembly, thus allowing simpler tooling to be used to fabricate the sidewall panel. This inventive configuration also allows interchangeable inserts to be used in the panel opening, i.e., either a window assembly (with reveal) or a blank cover plate, so that the sidewall panel can be reconfigured without complete removal and replacement of the entire sidewall panel, as is done in the prior art. This in turn allows sidewall panels to be reconfigured for monument placement in less time and with less expense than is required by the prior art.

An embodiment of the invention disclosed herein includes window sculpturing within the reveal of the window assembly that is inserted into the window opening, so that the number of distinct sidewall panel types may be reduced to one or two. By eliminating window sculpturing in the sidewall, the sidewall panels that may be provided by the embodiment may have a constant linear profile longitudinally along the airplane length (station.) This in turn may allow a standardized cover plate to be used to fill the window opening when not in use. These cover plates may be flush with the panel surface since sculpturing is not present on the panel, so that a standardized surface profile may be made available for the placement of monuments against the sidewall surface. The cover plates may be furnished with snap-fit fasteners that allow the cover plates to snap in and out of the panel openings. The window assembly may be similarly furnished with snap-fit fasteners similar to those of the cover plates. These snap-fit fasteners may be integral to the item, unlike the prior art, in order to permit these inserts to be attached without requiring special tools and to eliminate the requirement for separate fasteners to secure the inserts within the panel openings.

The advantages of such an arrangement may be seen in FIGS. 3A and 3B, which depict the same layout reconfiguration as shown in FIGS. 1A and 1B. If the sidewall panels and cover plates of the current invention were configured along the sidewall, only a sidewall panel 120c of a type having window openings 135a–135f in both sides would be required. The movement of the closet monument 140 would not require the removal and reinstallation of any sidewalls, but merely the removal of the cover plates 150a and 150b in window openings 135b and 135c, respectively, and reinstallation of the cover plates 150a and 150b into window openings 135d and 135e; seat rows 110a–110d would only be moved as required for the relocation of closet monument 140 and not for removal and reinstallation of any sidewall panel 120c. This procedure would obviously require less time and therefore less expense than heretofore.

For purposes of this disclosure, a snap-fit fastener may be considered to be a mechanical joint system where the part-to-part attachment is accomplished with locating and locking features (i.e. constraint features) that are homogeneous with or integral to one or the other of the components being joined. Such joining may require the (flexible) locking features to move aside for engagement with the mating part, followed by a return of the locking feature toward its original position to accomplish the interference required to fasten the components together. Locator features, the second type of constraint feature, are inflexible, providing strength and stability to the attachment. Although any of the three types of snap-fit fastenings, i.e. annular, cantilever, and torsional, may be used with the components described herein, the cantilever type may be used and described in the embodiments described herein without limiting the scope of the disclosure.

Figure 4A:
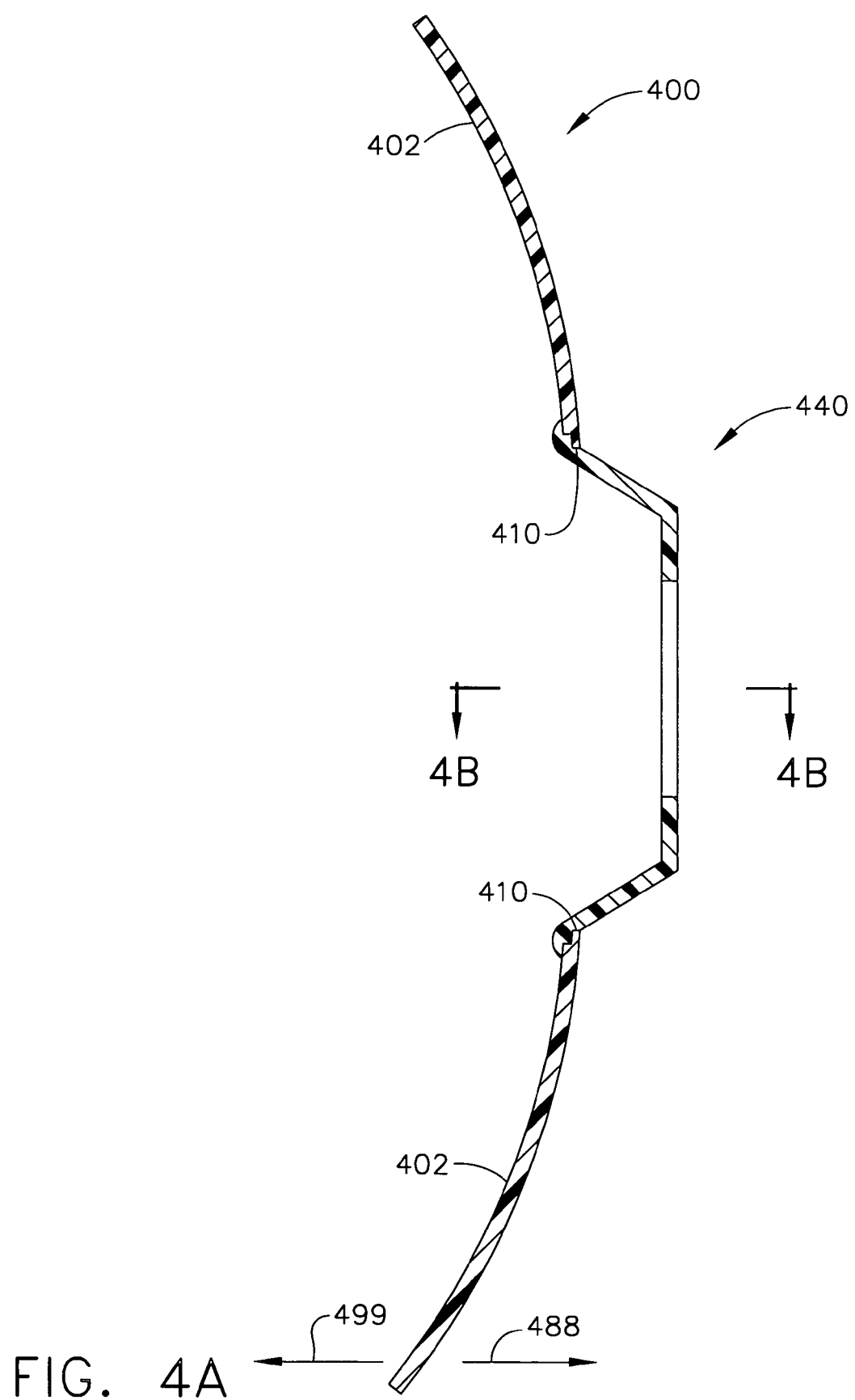
FIG. 4A is a cross sectional view taken along a vertical line of a sidewall panel where the sculpturing has been accomplished within the window assembly inserted in the panel opening, according to an embodiment of the present invention.
Figure 4B:
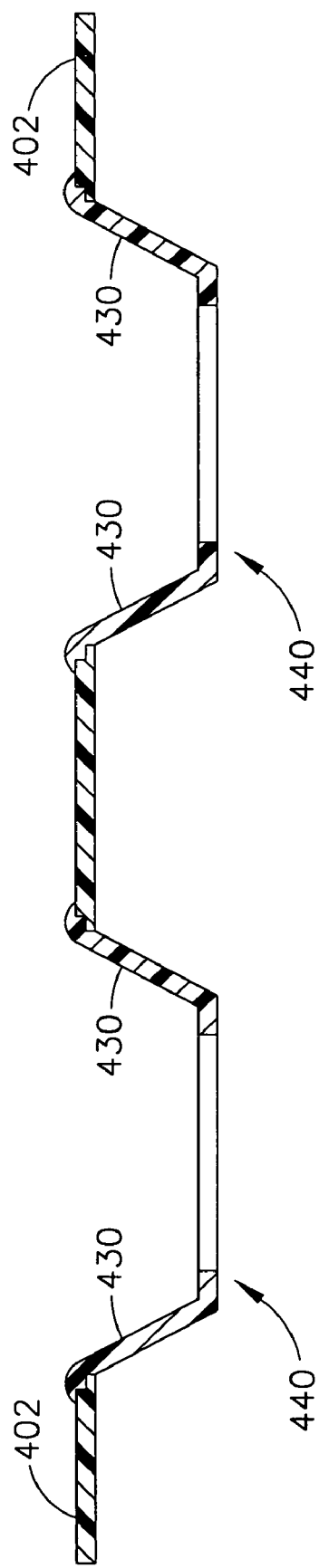
FIG. 4B is a cross sectional view taken along a horizontal line of a sidewall panel where the sculpturing has been accomplished within the window assemblies inserted through the panel openings, according to an embodiment of the present invention.

Referring now to FIGS. 4A and 4B, a sidewall panel 400 is shown according to an embodiment of the invention. The window assembly 440 may have lengthened sides to provide a sculpturing area 430 as a portion of the window assembly 440 instead as a portion of the sidewall panel 400. The profile of the sidewall panel 400 may be a smooth curve along its vertical cross section, as shown in FIG. 4A, so that the horizontal (longitudinal) cross section as shown in FIG. 4B may be linear. Geometrically, this means that all points on the surface of the sidewall panel 400 that fall upon a horizontal plane drawn through any portion of the sidewall panel 400 may fall along a straight line. This in effect eliminates any sculpturing from the sidewall panel (400) so that it may be included in the window assembly 440. The sculpturing around the panel opening 410 may be incorporated in the sculpturing area 430 of the window assembly 440 to allow a simple cover plate to be used to fill the panel opening 410 when the window assembly 440 is not required. Note that when passengers press against the window assembly 440, the sidewall panel 400 immediately behind the flange 450 of the window reveal perimeter may support such outboard loading.

Figure 5:
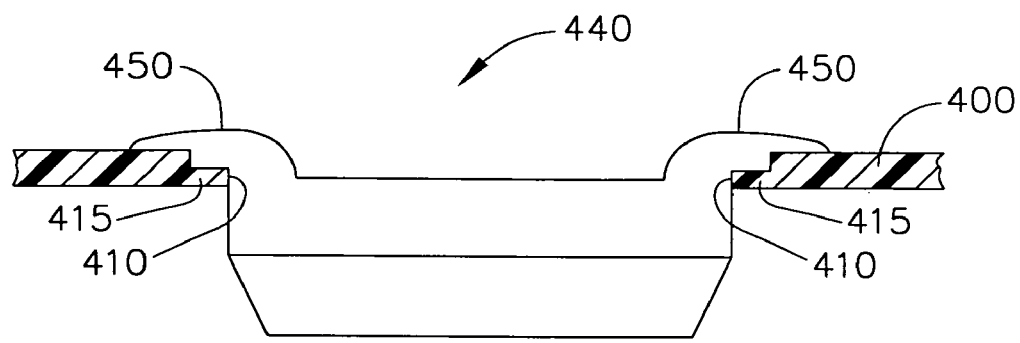
FIG. 5 is cross sectional view taken along a horizontal line of a window assembly to illustrate the manner in which it may be attached to a sidewall panel, according to an embodiment of the invention.
Figure 6:
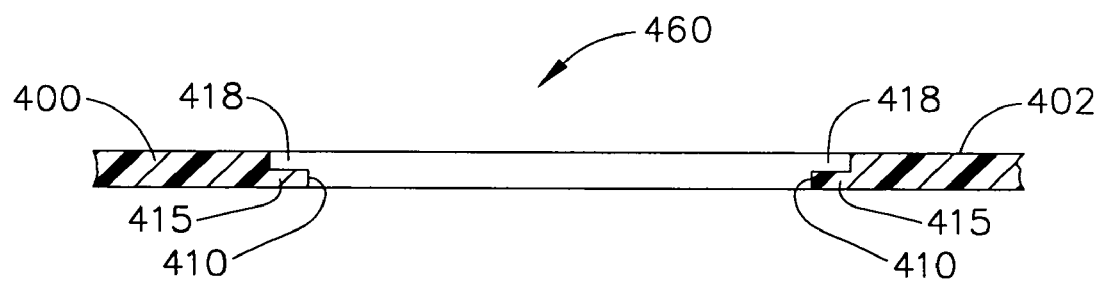
FIG. 6 is a cross sectional view taken along a horizontal line of a cover plate to illustrate the manner in which it may be attached to and made flush with the sidewall panel surface, according to an embodiment of the invention.

Referring to FIG. 5, a more detailed view of the window reveal shown in FIG. 4B may be seen. The window assembly 440 may be attached to the sidewall panel 400 by a flange 450 surrounding its perimeter, so that the flange 450 may make abutting contact with the inboard surface 402 of the sidewall panel 400. The window reveal of the window assembly 440 may support the flange that may snap into the panel opening 410 and held by a snap-fit fastener. In FIG. 6, a cover plate 460 may be seen inserted into the same panel opening 410 as the window assembly 440. The cover plate 460 may have an outwardly extending lip 418 sized for mating contact with the recessed lip 415 surrounding the panel opening 410, so that the surface of the cover plate 460 may be contiguous and flush with the inboard surface 402. The cover plate 460 may be held in place by snap-fit fasteners as will be presently seen. By creating inserts, i.e. the window assembly 440 and the cover plate 460, that snap into the same panel opening 410, the same sidewall panels 400 may be used for any combination of windows and for any monument location required by the layout, since the inboard profile of the sidewall panels are the same throughout.

Figure 7:
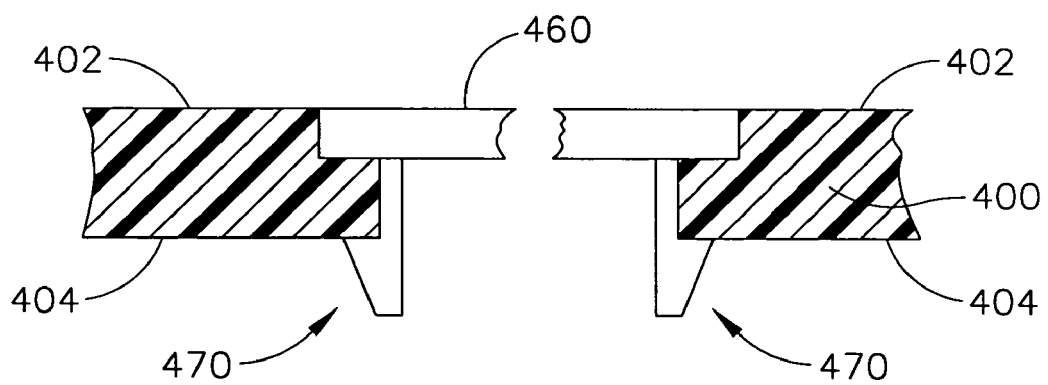
FIG. 7 is a cross sectional view taken along a horizontal line of a cover plate attached to the panel opening through use of a snap-fit fastener, according to an embodiment of the invention.

Referring to FIG. 7, a snap-fit latching mechanism may be seen according to an embodiment of the invention. One or more snap-fit fasteners 470 may be fabricated as part of the cover plate 460. Each snap-fit fastener 470 may be of a cantilever type that may be integral to the cover plate 460 along its perimeter. Each snap-fit fastener 470 may be configured so that it moves inwardly as the cover plate 460 is inserted into the panel opening 410 and then snaps back to engage against the outboard side 404 of the sidewall panel 400. The snap-fit fasteners 470 may be disengaged from the outboard side of the sidewall panel 400 when the sidewall panel 400 is removed from its installed position; alternatively, features may be added to disengage the snap-fit fasteners from the inboard side of the sidewall panel 400 by using small tool holes (not shown) that are well known in the art. Either method may for safety purposes prevent passengers removing the inserts.

Figure 8:
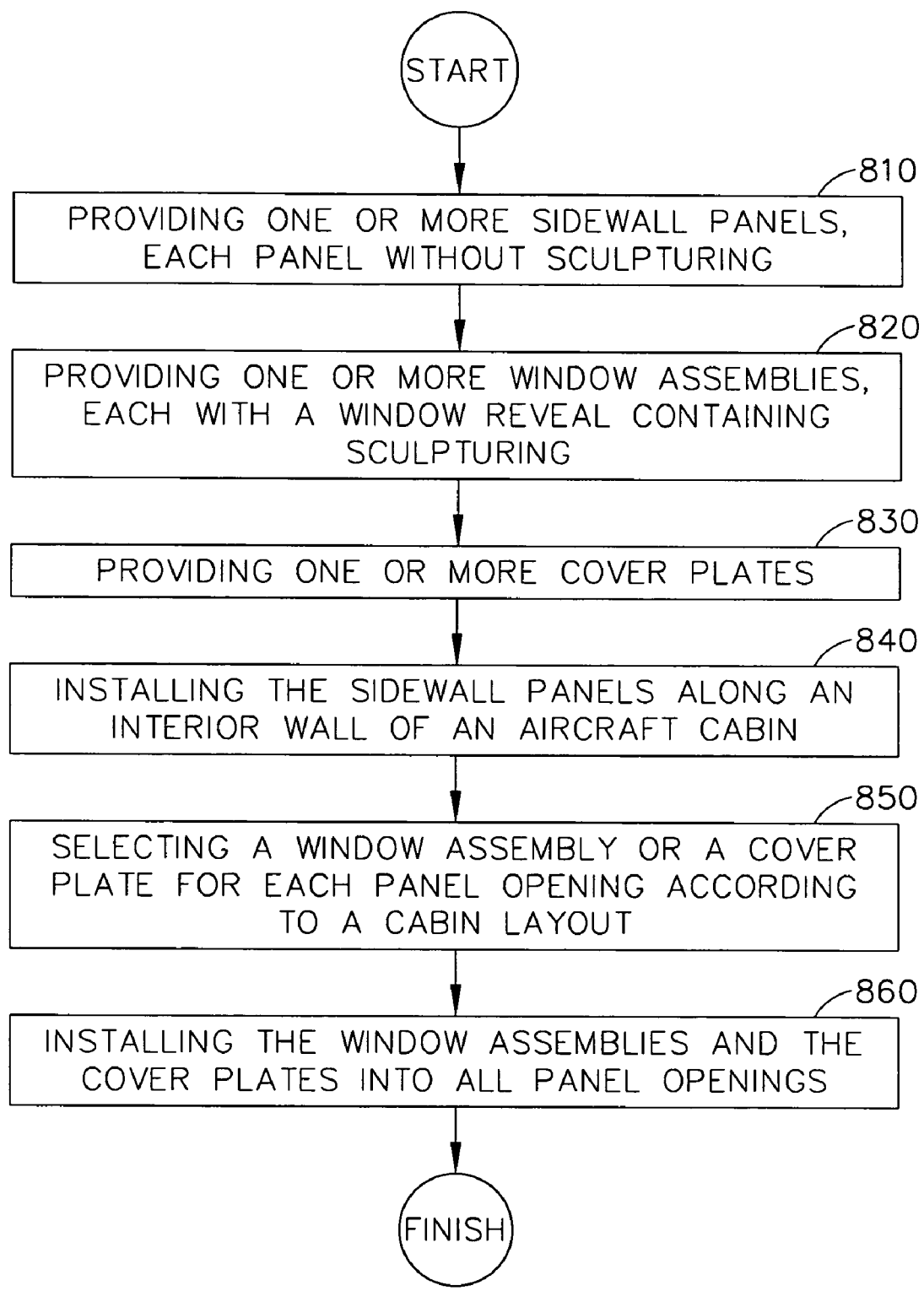
FIG. 8 is a flowchart showing a method of enclosing the interior of an aircraft cabin, according to an embodiment of the invention.

Referring now to FIG. 8, a flowchart of a method for enclosing an interior wall of an aircraft cabin is shown. A sidewall panel 400 is provided according to the block labeled 810, where the sidewall panel 400 may have one or more sidewall panel openings 410. The sidewall panel 400 may lack any sculpturing around its panel opening 410, so that the cross section of the sidewall panel 400 is longitudinally linear but vertically curved to conform to the interior side of the aircraft frame. One or more window assemblies 440 may also be provided according to the block labeled 820, each window assembly 440 having the desired sculpturing in the window reveal surrounding the window assembly 440. Similarly, one or more cover plates 460 may also be provided according to the block labeled 830, where each cover plate 460 may have the same curvature as the sidewall panel 400 so that it may be flush with the inboard surface 402 of the sidewall panel 400. The window assemblies 440 and the cover plates 460 may be sized for insertion within the panel openings 410. The sidewall panels 400 may be installed along the interior aircraft cabin wall, according to the block labeled 840, without regard to the layout of the aircraft cabin. Either a window assembly 440 or a cover plate 460 may be selected according to the desired arrangement of seats and monuments within the aircraft cabin, according to the block labeled 850. The window assemblies 440 and cover plates 460 may then be installed within their designated panel openings 410, according to the block labeled 860.

Thus, a reconfigurable interior sidewall system has been described, which may be easily reconfigured for different layouts within the aircraft cabin in less time than heretofore. The interior sidewall system may provide an inner window assembly in which any sculpturing around the panel opening is moved from the sidewall panel to the window reveal of the inner window assembly. It may also provide a cover panel that may be used to fill the panel opening in such a way as to provide a constant profile across all sidewall panels for placement of monuments within the aircraft cabin. It should be understood, of course, that the foregoing relates to exemplary embodiments of the invention and that modifications may be made without departing from the spirit and scope of the invention as set forth in the following claims.

We claim:

1. A configurable sidewall assembly for an aircraft frame, comprising
   a sidewall panel with an inboard surface and an outboard surface, the sidewall panel with a curvature conforming to an outboard surface of the aircraft frame, the sidewall panel having a panel opening;
   a window reveal sized for removeable insertion into the panel opening; and
   a cover plate sized for removeable insertion into the panel opening, wherein the sidewall panel has two selectable configurations: a first configuration wherein the cover plate alone is inserted into the panel opening, and a second configuration wherein the window reveal alone is inserted into the panel opening.

2. The configurable sidewall assembly described in claim 1, wherein the cover plate is flush with the inboard surface.

3. The configurable sidewall assembly described in claim 1, wherein the cover plate is releasably attached within the panel opening by a snap-fit fastener.

4. The configurable sidewall assembly described in claim 3, wherein the snap-fit fastener is a cantilever type fastener.

5. The configurable sidewall assembly described in claim 4, wherein the snap-fit fastener is releasable from the outboard side of the sidewall panel.

6. The configurable sidewall assembly described in claim 1, wherein the window reveal is configured with sculpturing around its perimeter.

7. The configurable sidewall assembly described in claim 1, wherein the window reveal is releasably attached within the panel opening by a snap-fit fastener that is releasable from the inboard side of the sidewall panel.

8. An interior sidewall system for a layout of a cabin area in an aircraft, the system comprising a plurality of sidewall panels, each panel curved vertically to conform to an interior side of an aircraft frame and horizontally linear, each panel with at least one opening with all openings having an identical shape;

a plurality of cover plates shaped for removeable insertion in one of the openings; and a plurality of window assemblies shaped for removeable insertion in one of the openings, each window assembly having a window reveal configured with sculpturing, the window reveal with a flange for abutting contact with the inboard surface of a selected panel and held in releasable attachment thereto by a snap-fit fastener that is released from the inboard side of the selected panel; wherein each opening is selectively provided with one of the cover plates or one of the window assemblies selected according to the layout.

* * * * *